(12) United States Patent
Lian

(10) Patent No.: US 7,213,427 B1
(45) Date of Patent: May 8, 2007

(54) ELECTRONIC STEERING WHEEL LOCK

(76) Inventor: Gen-Lin Lian, P.O. Box 166-13, Taipei (TW) 115

( * ) Notice: Subject to any disclaimer, the term of this patent is extended or adjusted under 35 U.S.C. 154(b) by 0 days.

(21) Appl. No.: 11/640,268

(22) Filed: Dec. 18, 2006

(51) Int. Cl.
*B60R 25/02* (2006.01)

(52) U.S. Cl. .............. 70/209; 70/278.7; 70/279.1; 70/278.2; 70/278.3

(58) Field of Classification Search ............. 70/209, 70/278.7, 279.1, 278.2, 278.3
See application file for complete search history.

(56) References Cited

U.S. PATENT DOCUMENTS

| | | | | |
|---|---|---|---|---|
| 4,935,047 A | * | 6/1990 | Wu | 70/209 |
| 5,412,963 A | * | 5/1995 | Carlo et al. | 70/209 |
| 6,584,817 B1 | | 7/2003 | Lien | |
| 2004/0099025 A1 | * | 5/2004 | Wang | 70/209 |

* cited by examiner

*Primary Examiner*—Suzanne Dino Barrett
*Assistant Examiner*—Kristina R Gluchowski (57) ABSTRACT

The present invention is to provide an actuating means 10 of the steering wheel lock 20. It must be open by a chip contained key 7. The actuating means 10 includes a framework 1, an actuator 2, a brake member 3, a driving member 4, and a printed circuit board (PCB) controller 5. Said PCB controller 5 has a five pin header connector 51 for connecting a crimp jack 73 of the chip contained key 7 to activate the driving member 4 and the brake member 3. The brake member 3 can alternate the status of the driving member 4 to close or open the lock. The actuating means 10 further can be open by the key 7 equipped with a self-contained battery 71 to furnish a power to the actuating means 10.

1 Claim, 7 Drawing Sheets

ELECTRONIC STEERING WHEEL LOCK

FIELD OF THE INVENTION

The present invention is related to a steering wheel lock, in particular to a chip contained key with self-contained batteries slid into an actuating means to open the steering wheel lock.

BACKGROUND OF THE INVENTION

Actuating means disposed inside a solid steel or brass padlock to avoid impacts from outer force, usually electronic component is not allowed as a would-be component of such a key.

Recently, due to the computer technology has made progress; those skilled in the art have provided electronic locks by detecting passwords or codes to determine whether a user is capable of delivering on "open, sesame" digital signals invoked by design and implementation for digital communication system, thus to secure house door, car door by such signal processing through an electronic component, which is incorporated into a lock.

For instance, U.S. Pat. No. 6,584,817 entitled "electronic anti-theft lock" to Chih Min Lien on Jul. 1, 2003. Lien taught a chip-contained key adapted to an electronic lock; a set of IC codes (or passwords) can be detected by a control circuit to determine whether the key can further electronically open the lock or not. And an electromagnetic valve disposed in the lock is routinely actuated to close the lock. If the control circuit is out of power, the electromagnetic valve is not energized; an electronic lock is mechanically open by such a chip-contained key.

Besides, kinds of keyless electronic locks such as keypad lock or multiple controls for remote control lock are already commercially available on the market, their operated modes likely an exquisite communication apparatus is only to regulate the user's behavior such as detecting multiple codes or sensor signals; and to perform instructions by an electromagnetic valve installed inside the electronic lock, such an electromagnetic valve is routinely actuated to close the electronic lock in '817.

Accordingly, a card or intrusive detective sensor (such as a chip-contained key) is provided to sense whether the IC code is circulated through the electronic component it specifies the requirements for opening the electronic lock. If the signal is promptly detected, the chip can energize the electromagnetic valve in the lock, such as described in '817 to retract a telescopic shaft (i.e. locking bolt) to turn a turning plate with a finger step by step to adapt to a series of wave-like locating teeth for moving the locating mechanism inward or outward. Thereby, the electronic lock can be open or close.

But, such an electronic lock is added to a mechanical lock as a "preparatory lock". Once the power supply is interrupted, this kind of electronic lock is timely invalid. However, a steering wheel lock should be equipped with a key equipped with self-contained battery to reduce the inconvenience of the prior art.

SUMMARY OF THE INVENTION

Accordingly, the present invention is to provide an actuating means, when locking, combined to a steering wheel integrally as a whole; even during power supply interruption the electronic component fails to circulate signals, the actuating means still can be operated promptly.

To point against aforesaid problems, the present invention is realized by an actuating means 10 incorporated into a steering wheel lock 20 can be open by a chip-contained key 7 equipped with self-contained battery 71 comprising:

A framework 1;

An actuator 2 mounted on said framework 1, includes a longitudinal axis 21 with a peripheral flange 211 bulged out overhanging a base portion 24 thereof, a distal end 221 of a compressive spring 22 fits over the base portion 24 under the flange 211, a stop 23 fits in a proximal end 222 of the compressive spring 22;

A head portion 25 of the longitudinal axis 21 protruded upward from a top 11 of the framework 1, a project portion 231 of the stop 23 protruded downward from a bottom 12 of the framework 1, the compressive spring 22 is disposed inside the framework 1, both of distal end 221 and proximal end 222 resist against the flange 211 of the longitudinal axis 21 and the stop 23 respectively; thereby the longitudinal axis 21 and the stop 23 can make a longitudinal movement about the framework 1.

A brake member 3 mounted in the framework 1, includes a tongue 31, a tongue axis 32, a torsion spring 33 fit over the tongue axis 32, both of distal and proximal ends 331,332 of the torsion spring 33 prop against the tongue 31 and the framework 1 respectively, thereby the tongue 31 is mounted for pivotal movements on the tongue axis 32, location of the tongue 31 is limited between said flange 211 of longitudinal axis 21 and the top 11 of the framework 1.

A driving member 4 disposed to said framework 1, includes a motor 41, an axle 411 of the motor 41 extended into the framework 1, a cam 42 in a shape of a diamond is connected to the axle 411 thereof, and a micro switch 43; said cam 42 starts an in-cycle part rotation clockwise first to cause said tongue 31 separated from the flange 211 and then the cam 42 is in contact with the micro switch 43; finally, the cam 42 is in continuation to rotate to the original point.

A PCB controller (printed circuit board) 5 (i.e. lock controller) set on said framework 1 equipped with a five pin header connector 51 for connecting a chip-contained key 7 with a crimp jack relative to the header connector slid into, thereby the driving member 4 is activated.

An actuating means 10 of said electronic lock is capable of being incorporated into a steering wheel lock 20; the steering wheel lock 20 includes a secondary shaft 62, a primary shaft 61 formed with a series of wave-like notches 611 can be movable between a telescopically extended position and a retracted position into said secondary shaft 62, an upper housing 63 is in combination with secondary shaft 62, a lower housing 64 is mounted below the upper housing 63, and a piece of steering wheel baffle 65 secured to an underside of the lower housing 64; said actuating means 10 is mounted inside the upper and lower housings 63, 64, the project portion 231 of the actuating means 10 is allowed to adapt to one of the wave-like notches 611 on the shaft 61, and the project portion 231 is glided to embed in the notch 611 one after another as the primary shaft 61 is pulled out or inserted into the secondary shaft 62 gradually.

The chip-contained key 7 comprises self-contained battery 71, a controller 72 (i.e. chip, not shown), an LED (light emitting diode) 721 and a crimp jack 73; in response to the chip-contained key 7 being slid into in operation, the actuating means 10 equipped with, at least, a micro switch 43, a driving member 4, and a controller 5 is required.

A link between the controller 72 and the controller 5 is established by the crimp jack 73 and the five pin header connector 51, which can be used to test for a difference of potential between points on opposite sides of them, the LED 721 on the controller 72 is illuminated as green light to show the power of the battery 71 is sufficient, but red light to show the power of the battery 71 is insufficient.

Other advantages, features, properties and aspects of this invention arise from the following description of one preferred embodiment using the drawings.

DETAILED DESCRIPTION OF THE PREFERRED EMBODIMENTS

In the figures, the same reference numbers are used for the same or similar parts, the corresponding or comparable properties and advantages being achieved, even if a repeated description is omitted.

Figure 1:
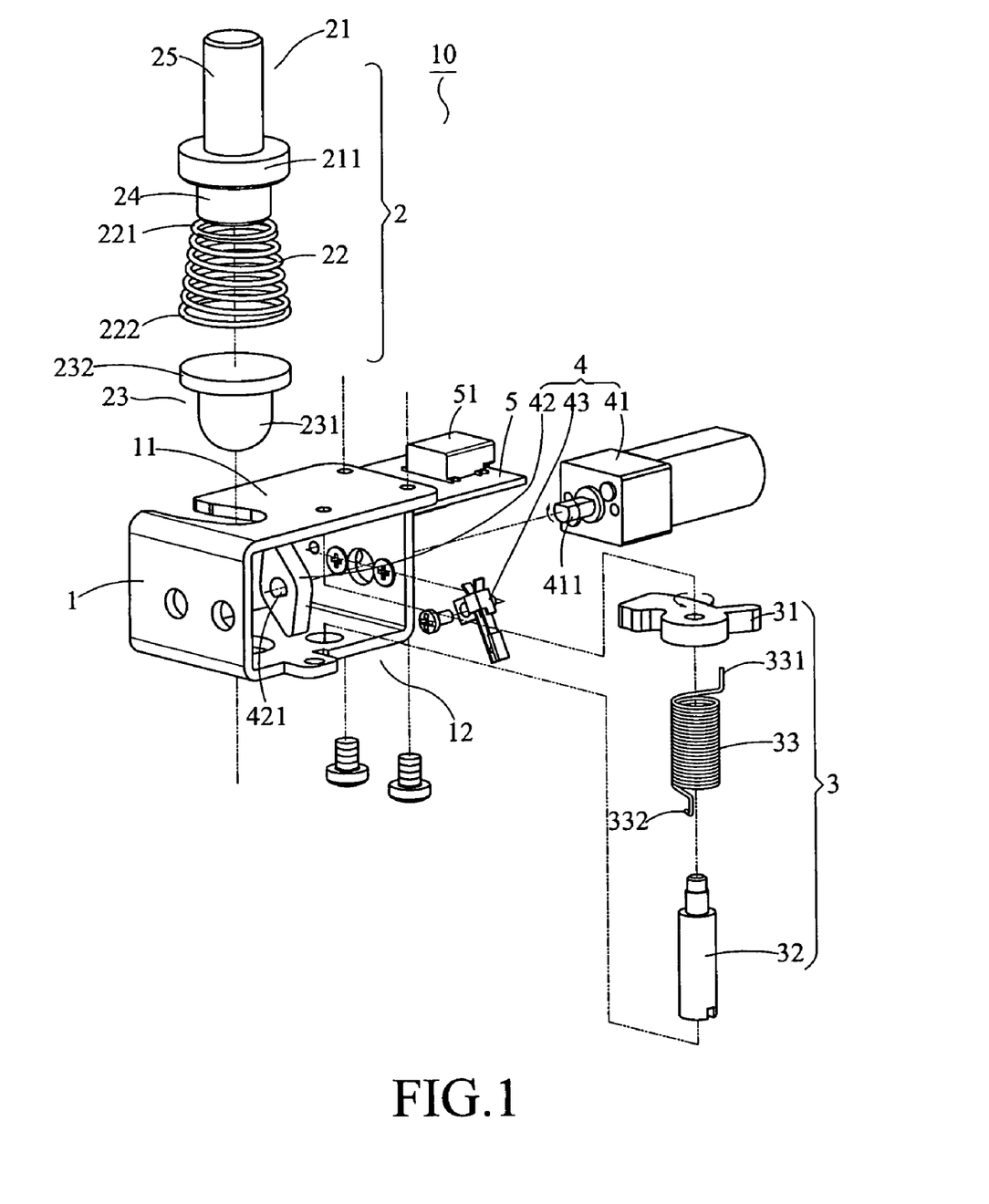
FIG. 1: shows an exploded view of the actuating means of the electronic lock to the steering wheel lock of the present invention.
Figure 2:
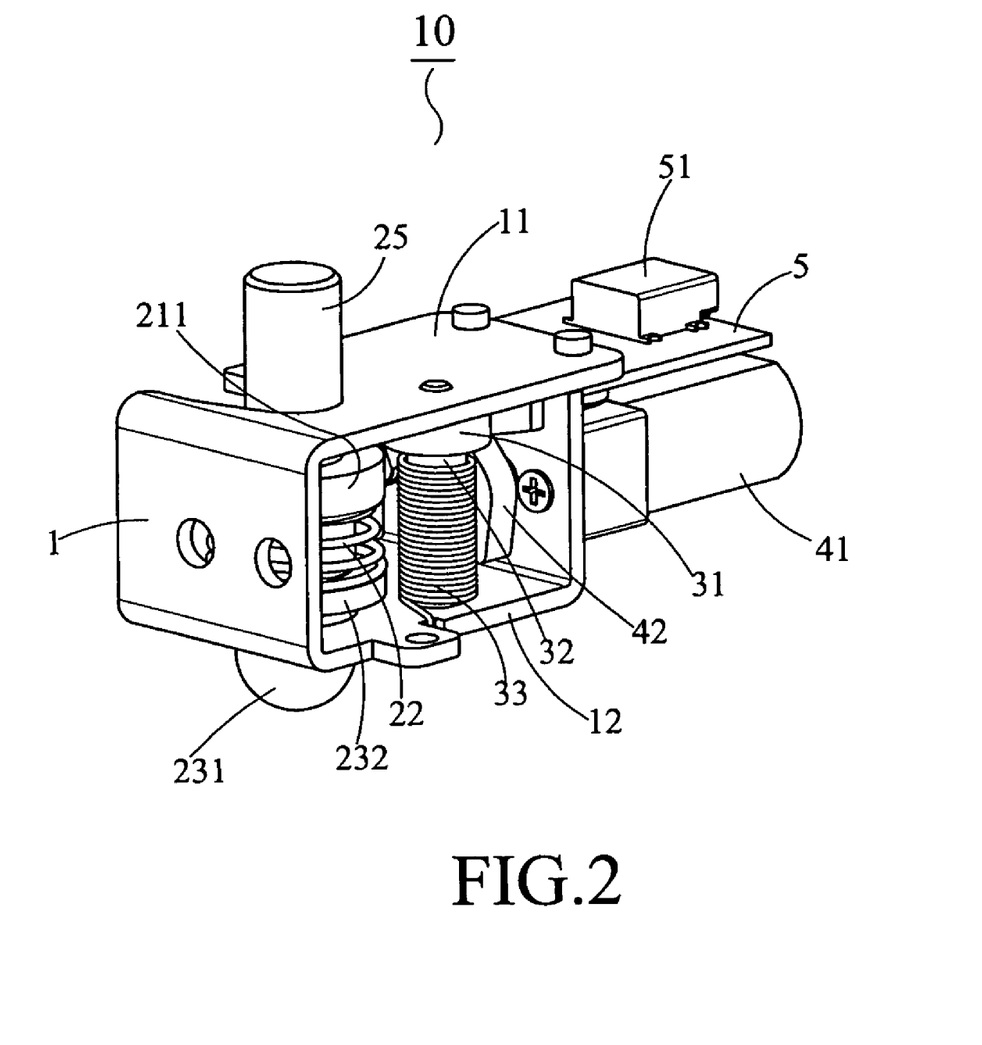
FIG. 2: shows an assembled view of FIG. 1.

As shown in FIG. 1, an exploded view of the actuating means of the steering wheel lock is illustrated. An actuating means 10 includes a framework 1, an actuator 2, a brake member 3, a driving member 4, a printed circuit board (PCB) controller 5, can be combined integrally as whole as shown in FIG. 2.

As mentioned above, the framework 1 is a metal frame mainly designed for protection of the elements within, a PCB controller 5 is fixed to a lateral side of the framework 1 adjacent to the driving member 4.

As mentioned above, an actuator 2 is installed inside the framework 1; it includes a longitudinal axis 21 with a peripheral flange 211 bulged out overhanging a base portion 24, a distal end 221 of a compression spring 22 fit over the base portion 24 below the peripheral flange 211, and a stop 23 fit in a proximal end 222 of the compression ring 22. A head portion 25 of said longitudinal axis 21 is protruded upward from a top 11 of the framework 1; a project portion 231 of said stop 23 is protruded downward from a bottom 12 of the framework 1. Compression spring 22 is placed into the framework 1, both the distal and proximal ends 221, 222 of the compression spring 22 resist against the peripheral flange 211 and a distal end 232 of the stop 23 respectively. Thereby, in the framework 1, the longitudinal axis 21 and the stop 23 can be moved longitudinally and elastically.

As mentioned above, a brake member 3 is installed inside said framework 1; it includes a tongue 31, a tongue axis 32, and a torsion spring 33 fit over the tongue axis 32. Both distal and proximal ends 331, 332 of the torsion spring 33 resist against the tongue 31 and a bottom 12 of the framework 1 respectively. The tongue 31 is pivoted on the tongue axis 32 and being elastically displaced between said peripheral flange 211 of the longitudinal axis 21 and the top 11 of the framework 1. (Please refer to FIG. 5)

As mentioned above, a driving member 4 is disposed to the framework 1 mainly outside a lateral wall of the framework 1. It includes a motor 41 with an axle 411 extended into the framework 1, a cam 42 in the shape of a diamond disposed inside the framework 1 adjacent to the lateral wall of the framework 1, the cam 42 has a central hole 421 for the axle 411 of the motor 41 fit through, and a micro switch 43 is designed to temporarily stop or change the current status of the driving member 4. Said a first end of the cam 42 starts an in-cycle part rotation in clockwise direction first to cause said tongue 31 separated from the flange 211 in counterclockwise direction and then a second end of the cam 42 is rotated continuously in clockwise direction in contact with the micro switch 43; thereby, the micro switch 43 is sensed a signal to stop the rotation temporarily, finally, the second end of the cam 42 is in continuation of its rotation in clockwise direction to the original point as the cam is rotated at 180 degrees. Thereby, whenever the cam is rotated in complete one circle at 360 degrees, the first and second ends of the cam 42 can activate the tongue 31 and the micro switch 43 twice.

Meanwhile, when rotating in the counterclockwise direction, the rotation of tongue 31 is temporarily out of contact with the cam 42, and an elastic force is exerted by the torsion spring 31 to draw the tongue 33 back to its normal place. But the tongue 33 does not retract to the original location instantly due to the periphery flange 221 is already elevated and still resisted by the distal end 221 of the compression spring 22. In other words, the periphery flange 221 occupies the space where the tongue 33 is originally placed in position. The project portion 231 of the stop 23 is simultaneously detached from an originally adapted notch 611 of the primary shaft 61; the steering wheel lock 20 is in open status. Since a first end of the cam 42 in the shape of a diamond pushes the tongue 31 temporarily away from the flange 211, a second end of the cam 42 in the shape of a diamond later make a contact with the micro switch 43. Before the contact, it is rotated according to the axle 411 and cam 42 in continuation of its clockwise direction, but, after the contact, a rotation comes to a temporary halt, and the tongue 33 is retracted to the original location. It results in the project portion 231 embedded in another notch 611 of the primary shaft 61, and the steering wheel lock 20 in closed status.

As mentioned above, PCB (printed circuit board) controller 5 is installed to the lateral side of the framework 1, and the PCB controller 5 is placed above the driving member 4. It has a five pin header connector 51 for connecting a crimp jack 73 (not shown) of a key 7, the crimp jack 73 is relative to the five pin header connector 51. By such a connection in between, the key 7 can slide into the actuating means 10. Said five pine header connector 51 is designed to set up IC codes or passwords, differentiate electronically available IC codes or passwords from unrecognizable codes, output IC codes or passwords and switch off the power supply for the actuating means 10.

Next, an actuating means 10 added to the steering wheel lock 20 must be activated by an input power supply, which is not included in the actuating means 10, but a power source is fed to the PCB controller 5. Since the chip-contained key 7 equipped with self-contained battery 71 sliding into the five pin header connector 51 of the PCB controller 5 (i.e. controller) of the actuating means 10, as a result, the electric power source is to feed electricity power into the driving member 4 and PCB controller 5. The motor 41 (i.e. a mini motor) is energized to rotate its axle in-cycle part of rotation in clockwise direction and then in continuation of the rotation in its clockwise direction; the five pin header connector 51 is also energized to sense the IC codes specified for the PCB 5 to activate the actuating means 10. If the power source is depleted, an LED (light emitting diode) 721 installed to a controller 72 of the chip-contained key 7 is lit up with red light. It informs the user to replace the battery. When replaced, the power source will be sufficient to operate the actuating means 10. And LED 721 of the controller 72 lit up with green light indicates that the power of battery 71 is sufficient. The battery 71 is commercially available, such as CR2032 (3V coin-type (CR) Manganese Dioxide-Lithium Battery).

Figure 7:
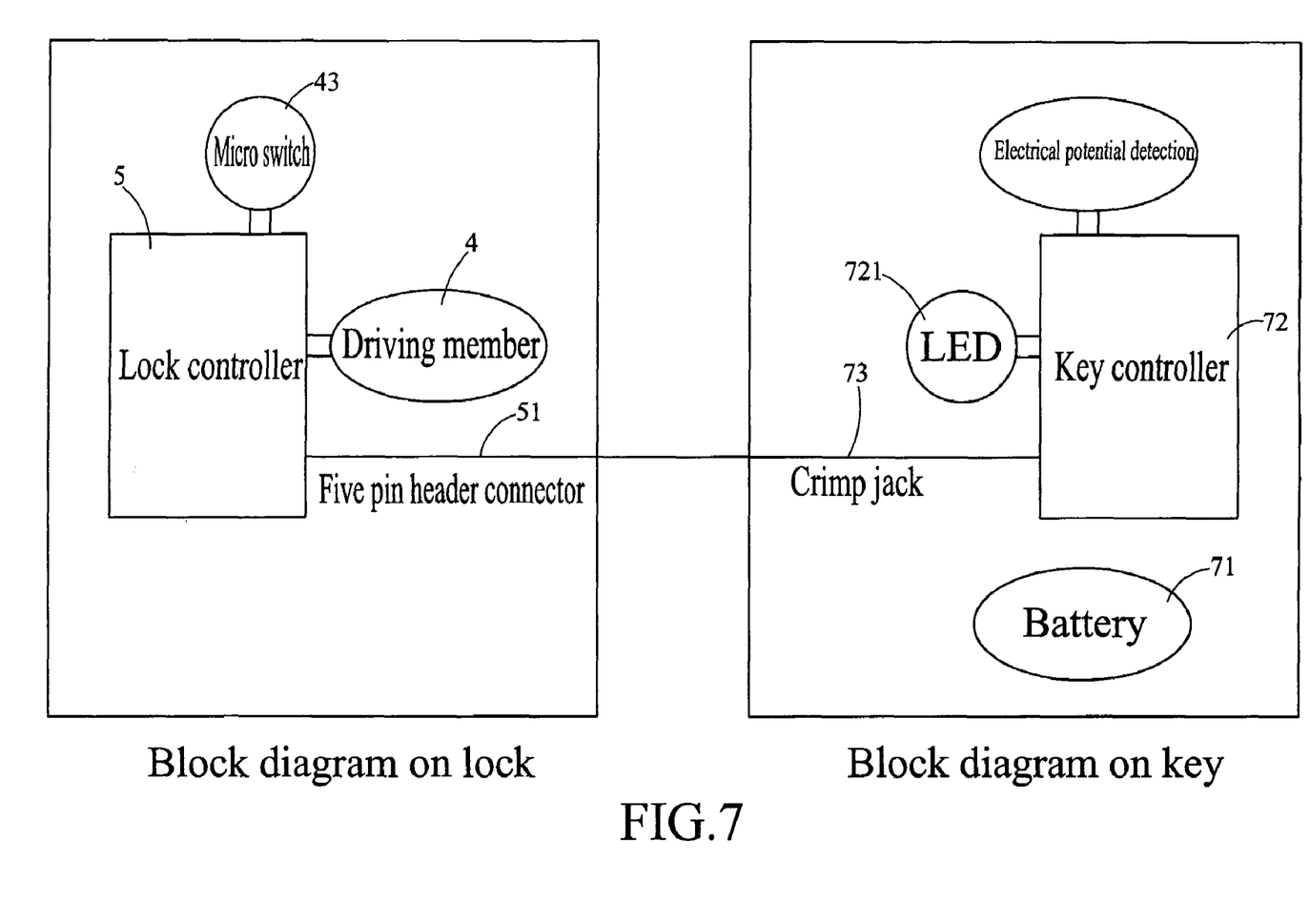
FIG. 7: shows a block diagram of the crimp jack and the five pin header connector testing an electric potential difference between the key controller and the lock controllers.

The self-contained battery 71 disposed on the chip-contained key 7 can immediately supply power to the actuating means 10 by means of a crimp jack 73 illustrated in the block diagram of FIG. 7, the crimp jack 73 of the key 7 is in connection with five pin header connector 51 of the PCB 5. They can be used to detect a difference of potential between points on opposite sides of them, the LED 721 on the controller 72 is illuminated to sign a tested result, when the LED is in green light, the power of the battery is sufficient for the key 7 to activate the actuating means 10, when the LED is in red light, the power of the battery is insufficient, and the self-contained battery 71 on the key 7 supplies electric power to the controller 5 all along. (please refer to FIG. 7) It is ensured that the power of the battery 73 is sufficient to operate the actuating means 10 so that the passwords or IC codes can be recognizable by the five pin header connector 51 in normal operation. What is worthy of a note is that the key 7 is in contact with the five pin header connector 51 for only a few seconds to open or close the actuating means 10 promptly. The key 7 is normally kept a distance to the five pin header connector 51 to save the power of the battery 73.

Thereby, whenever the LED 721 of the key 7 is lit up, the actuating means 10 secured to the steering wheel lock 20 can be promptly open by key 7. The security of the steering wheel lock 20 is improved.

Furthermore, the actuating means 10 is essentially combined to a steering wheel lock 20, more details about the steering wheel lock 20 are described hereinafter.

Figure 3:
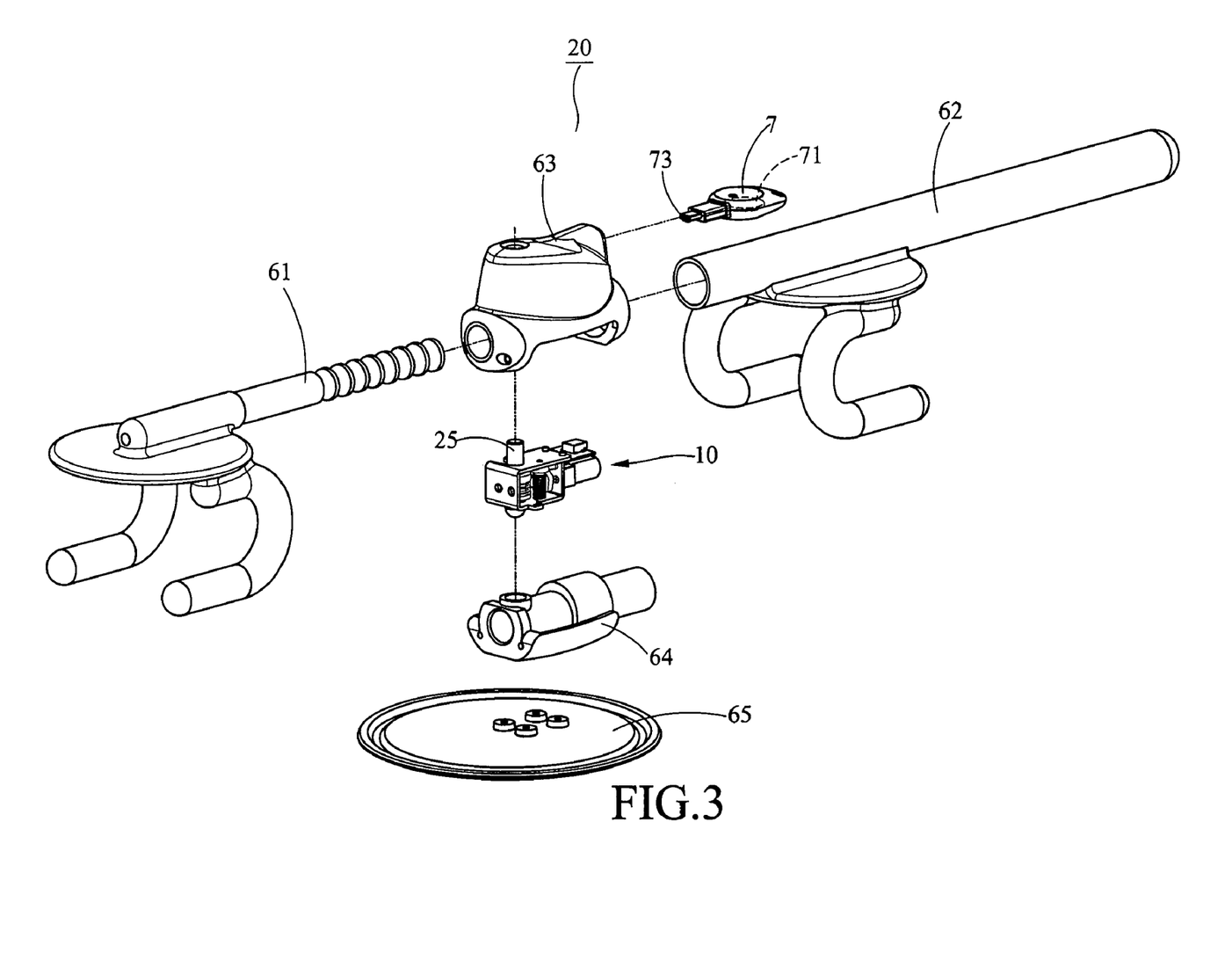
FIG. 3: shows a schematic view of the actuating means incorporated to a steering wheel lock.
Figure 4:
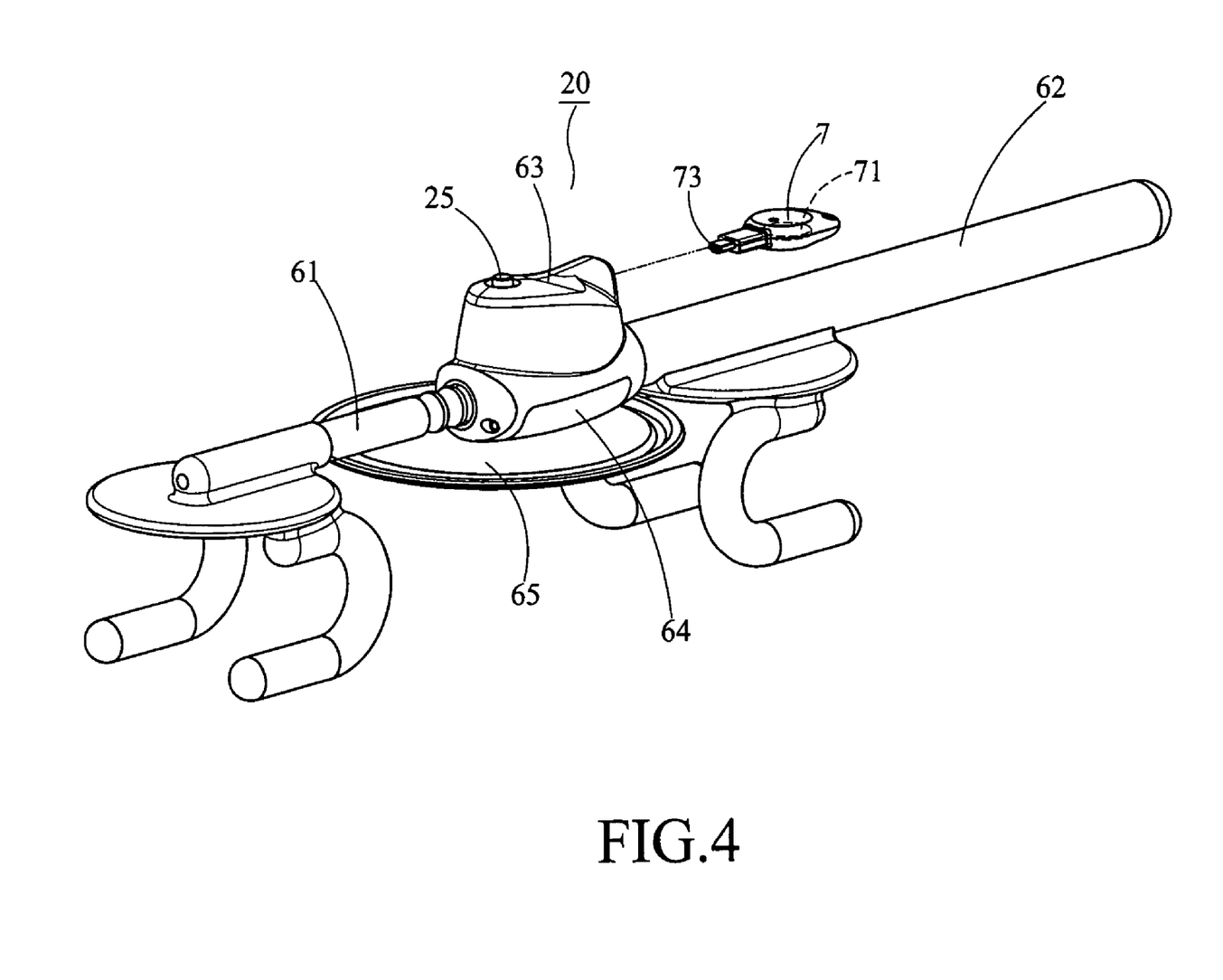
FIG. 4: shows a schematic view of the actuating means integrally combined to a steering wheel lock.

As shown in FIG. 3, a schematic view of the actuating means 10 integrally combined to a steering wheel lock 10 is illustrated. Wherein a steering wheel lock 20 includes a primary shaft 61, a secondary shaft 62 can be movable between a telescopically extended position and a retracted position into the primary shaft 61. An upper housing 63 is combined with the primary shaft 61, a lower housing 64 is combined with the secondary shaft 62, and a baffle 65 is disposed to the underside of the lower housing 64. The actuating means 10 is mounted inside the upper and lower housings 63,64. The chip contained key 7 with the controller 72 (chip) built-in related to the crimp jack 73 (not shown) is suitable for opening or closing the actuating means 10. After combination, a schematic view of the steering wheel lock 20 is illustrated in FIG. 4.

Figure 5:
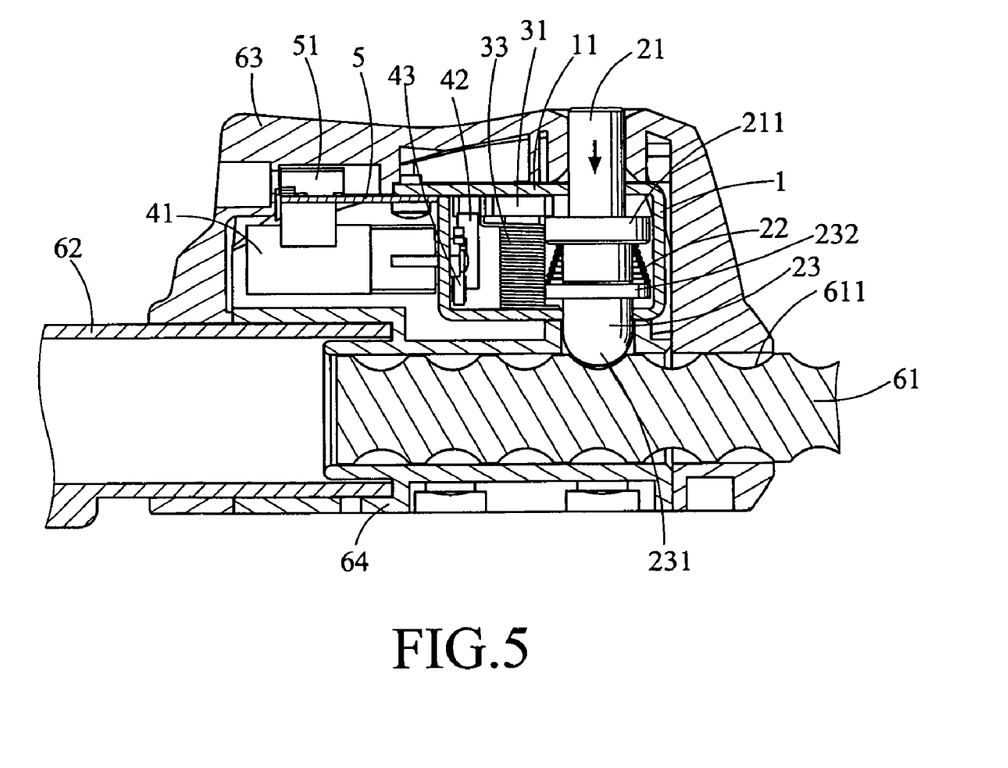
FIG. 5: shows a schematic view of the closed steering wheel lock.
Figure 6:
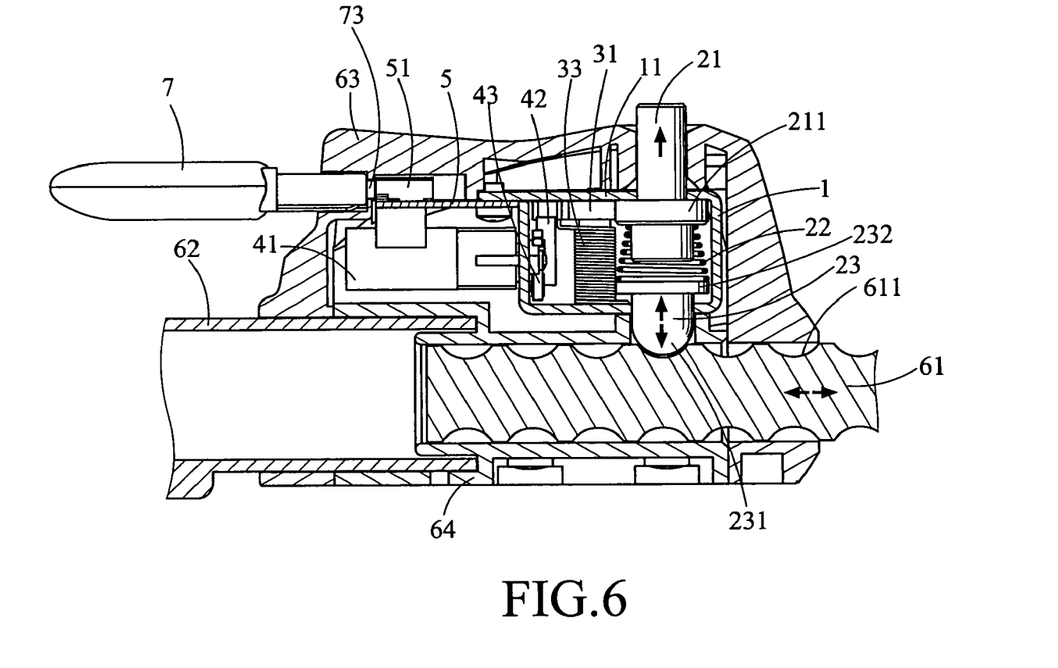
FIG. 6: shows a schematic view of the open steering wheel lock.

The actuating means 10 is essentially incorporated into a steering wheel lock 20. As shown in FIGS. 5 and 6, schematic views of the movement of the actuating means 10 integrally combined to a steering wheel lock 20 are illustrated. In FIG. 5, when the longitudinal axis 21 being pressed downward, the tongue 31 is urged by the torsion spring 33 to move between the peripheral flange 211 and the top 11 of the framework 1, in turn, the pressure exerted by the tongue 31 is transferred to the compress spring 22, which can be compressed to a maximum extent, that the distal end 232 of the stop 23 is in contact with an underside of the base portion 24 under the peripheral flange 211. Meanwhile, a series of wave like notches 611, or concaved rings along the primary shaft 61 is glidingly adapted to the project portion 231 of the stop 23 to take turns one after another, the distal end 232 of the stop 23 is also in contact with a base portion 24 of the longitudinal axis 21. As the stop 23 is positioned without any upward or downward movements, and the primary shaft 61 is not to pull out from the secondary shaft 62, so the steering wheel lock 20 is in closed status.

As shown in FIG. 6, when the chip-contained key 7 being slid into the five pin header connector 51 to differentiate IC codes or passwords from unrecognizable codes, starts the motor 41 in-cycle part rotation with the cam 42 and the tongue 31 (where the motor 41 is energized by the self-contained batteries of key 7), after that, the tongue 31 can be detached from the location between the peripheral flange 211 and the top 11 of the framework 11. Once the compression spring 22 is expanded, it makes the longitudinal axis 21 move upward until the peripheral flange 211 resists against the top 11 of the framework 11. At this time, a gap between the distal end 232 of the stop 23 and the base portion 24 of the longitudinal axis 21 is allowed for an elastically longitudinal movement in between. Because the stop 23 is already detached from the wave like notches 611 or concaved rings along the primary shaft 61, which can be pulled out or inserted into the secondary shaft 62 as desired, thus the steering wheel lock is open. (please refer to FIG. 6)

Besides, a first end of said cam 42 in the shape of a diamond is in-cycle of rotation and then is rotated in continuation of the rotation in clockwise direction according to the axle 411 extended from the motor 41, in turn, the tongue 31 is also rotated away from the flange 211 in counterclockwise direction, when the tongue is temporarily removed to leave some leeway for the longitudinal axis 21 to move upward, after that, a second end of the cam 42 is in contact with a micro switch 43. Thereby, the micro switch 43 is temporarily to stop the rotation. And then the cam 42 is rotated in the same clockwise direction to the original point not to stop the tongue 31. Thereby, the tongue 31 is activated by the torsion spring 33 to press downward the longitudinal axis 21 once again and locate between the peripheral flange 211 and the top 11 of the framework 1 to close a steering wheel lock 20 as FIG. 5 shown.

Benefits Attained by Realization of the Present Invention

The actuating means 10 combined to a steering wheel 20. Because the actuating means 10 itself is already incorporated with IC codes or passwords anti-theft function, and the actuating means 10 incorporated into the steering wheel lock 20 can improve the anti-theft capacity thereof. Thereby, the steering wheel lock 20 includes actuating means 10 within is hard to dissemble by the theft.

Under the circumstance of supply interruption, to open the steering wheel lock can still be performed by a chip-contained key 7 with self-contained battery 71 at once.

In use, whenever the longitudinal axis 21 being pressed downward, the steering wheel lock is in a closed status. When opening, once the crimp jack 73 of the chip-contained key 7 slides into the five pin header connector 51, the steering wheel lock 20 is open instantly. The operation is easy and brief, can be completed in one step.

As the actuating means 10 is incorporated with five pin header connector to set up IC codes, which specifies the requirements for opening the lock, an imitator hardly traces back and copies the actuating means once for all. Even an imitator modifies the structure of the steering wheel lock; IC codes or passwords kept between the match of five pin header connector and the crimp jack are hardly detected by the imitator immediately. Furthermore, the power supply for the actuating means is surely supplied from the key equipped with self-contained battery. Either power supply or IC codes is under control by a match of the key and the actuating means; thus the steering wheel lock 20 can make the imitator shrink from the thought of having to face a so complicated actuating means at the sight.

Even when the chip contained key 7 is lost, a spare key 7 ready for use can be used to open the actuating means, there are three keys as an accompaniment of a steering wheel lock, one is the primary key-it need to preserve in a safety place, while the other secondary keys can be used to open the lock. Once the secondary keys are lost, the primary key can be applied to make the other secondary keys easily. And only the primary key is endowed with the capacity to set up the IC codes or passwords for the actuating means.

The invention claimed is:

1. An actuating means (10) incorporated into a steering wheel lock (20) operated by a chip-contained key (7) equipped with self-contained battery (71) comprising:

a framework (1);

an actuator (2) mounted on said framework (1), includes a longitudinal axis (21) with a peripheral flange (211) bulged out overhanging a base portion (24) thereof, a distal end (221) of a compressive spring (22) fits over the base portion (24) under the flange (211), a stop (23) fits in a proximal end (222) of the compressive spring (22);

a head portion (25) of the longitudinal axis (21) protruded upward from a top (11) of the framework (1), a project portion (231) of the stop (23) protruded downward from a bottom (12) of the framework (1), the compressive spring (22) is disposed inside the framework (1), both of distal end (221) and proximal end (222) of the compressive spring (22) resist against the flange (211) of the longitudinal axis (21) and a distal end (232) of the stop (23) respectively; thereby the longitudinal axis (21) and the stop (23) can make a longitudinal movement in the framework (1);

a brake member (3) mounted on the framework (1), includes a tongue (31), a tongue axis (32), a torsion spring (33) fit over the tongue axis (32), both of distal and proximal ends (331,332) of the torsion spring (33) prop against the tongue (31) and the framework (1) respectively, thereby the tongue (31) is mounted for pivotal movements on the tongue axis (32), location of the tongue (31) is limited between said flange (211) of longitudinal axis (21) and the top (11) of the framework (1);

the steering wheel lock (20) includes a secondary shaft (62), a primary shaft (61) formed with a series of wave-like notches (611) can be movable between a telescopically extended position and a retracted position into said secondary shaft (62), an upper housing (63) combined to the secondary shaft (62), a lower housing (64) mounted below the upper housing (63), and a piece of steering wheel baffle (65) secured to an underside of the lower housing (64); said actuating means (10) mounted inside the upper and lower housings (63, 64), the project portion (231) of the actuating means (10) is glidingly adapted to each notch (611) of the shaft (61) one after another;

the chip-contained key (7) comprises self-contained battery (71), a controller (72), an LED (light emitting diode) (721);

wherein a driving member (4) of the actuating means (10) disposed to said framework (1), includes a motor (41), an axle (411) of the motor (41) extended into the framework (1), a cam (42) in a shape of a diamond is connected to the axle (411), and a micro switch (43); a first end of said cam (42) starts an in-cycle part rotation in a clockwise direction first to cause said tongue (31) to separate from the flange (211) and then a second end of the cam (42) is in contact with the micro switch (43), thus signals for the micro switch (43) to stop the axle (411) and the cam (42) temporarily; finally, the second end of the cam (42) is rotated in continuation of the rotation in a clockwise direction to the original point;

a PCB (printed circuit board) controller (5) installed to said framework (1) equipped with a five pin header connector (51) for connecting the chip-contained key (7) with a crimp jack (73) relative to the five pin header connector (51) to slide into, thereby the driving member (4) is activated;

a connection between the controller (72) of the key (7) and the PCB controller (5) of the actuating means (10) is established by the crimp jack (73) in connection with the five pin header connector (51), a difference of potential between points on opposite sides of the crimp jack (73) and the five pin header connector (51) can be detected, the LED (721) on the controller (72) is illuminated, and the self-contained battery (71) on the key (7) supplies electric power to the controller (5) from the crimp jack (73) to the five pin header connector (51).

\* \* \* \* \*